United States Patent
Proemm

(10) Patent No.: US 7,743,866 B2
(45) Date of Patent: Jun. 29, 2010

(54) SPEED CONTROL SYSTEM AND METHOD FOR A MOTOR VEHICLE

(75) Inventor: Uwe Proemm, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 145 days.

(21) Appl. No.: 11/527,551

(22) Filed: Sep. 27, 2006

(65) Prior Publication Data

US 2007/0021898 A1      Jan. 25, 2007

Related U.S. Application Data

(63) Continuation of application No. PCT/EP2005/003453, filed on Apr. 1, 2005.

(30) Foreign Application Priority Data

Apr. 3, 2004    (DE) .................. 10 2004 016 513

(51) Int. Cl.
*B60K 31/00*    (2006.01)
*B60K 31/02*    (2006.01)
*B60K 31/04*    (2006.01)

(52) U.S. Cl. .................. 180/170; 180/179; 180/171

(58) Field of Classification Search ................ 180/170, 180/171, 178, 179
See application file for complete search history.

(56) References Cited

U.S. PATENT DOCUMENTS

| | | | |
|---|---|---|---|
| 5,033,571 A * | 7/1991 | Morimoto ............... | 180/176 |
| 5,088,043 A * | 2/1992 | Akishino et al. ............ | 701/93 |
| 5,507,705 A | 4/1996 | Hara | |
| 6,078,859 A * | 6/2000 | Jastrzebski et al. ............ | 701/93 |
| 6,339,739 B1 * | 1/2002 | Folke et al. .................. | 701/70 |
| 6,460,645 B1 * | 10/2002 | Asada et al. ............... | 180/179 |

FOREIGN PATENT DOCUMENTS

| | | |
|---|---|---|
| DE | 43 38 092 C2 | 5/1995 |
| DE | 195 13 629 A1 | 10/1995 |
| DE | 195 37 273 A1 | 4/1997 |
| DE | 197 19 475 A1 | 11/1998 |
| DE | 199 61 720 C2 | 8/2001 |
| DE | 100 64 307 A1 | 7/2002 |
| DE | 102 18 698 A1 | 11/2003 |
| DE | 102 19 800 A1 | 11/2003 |

(Continued)

OTHER PUBLICATIONS

International Search Report dated Jun. 22, 2005 including English Translation of relevant portion (Four (4) pages).
German Office Action dated Dec. 8, 2004 including English Translation (Eleven (11) pages).
Notice of the reason of rejection and translation dated Sep. 24, 2008 (seventeen (17) pages).

(Continued)

*Primary Examiner*—Paul N Dickson
*Assistant Examiner*—John R Olszewski
(74) *Attorney, Agent, or Firm*—Crowell & Moring LLP

(57) ABSTRACT

A speed control system is provided for a motor vehicle, including units for calculating a drive torque or a brake torque as a function of a pre-definable target speed, the target speed being pre-defined by the single actuation of an operable control element. A sustained actuation of the control element is used to pre-define a target acceleration, instead of a target speed. The drive torque or brake torque are calculated from the target acceleration.

4 Claims, 1 Drawing Sheet

FOREIGN PATENT DOCUMENTS

| | | |
|---|---|---|
| EP | 0 930 192 A2 | 7/1999 |
| EP | 1 063 119 B1 | 12/2000 |
| JP | 3-81540 A | 4/1991 |
| JP | 5-38964 A | 2/1993 |
| JP | 7-277038 A | 10/1995 |
| JP | 2001-30798 A | 2/2001 |

OTHER PUBLICATIONS

Office Action in Japanese Patent Application No. 2007-505510 dated Mar. 3, 2009.

* cited by examiner

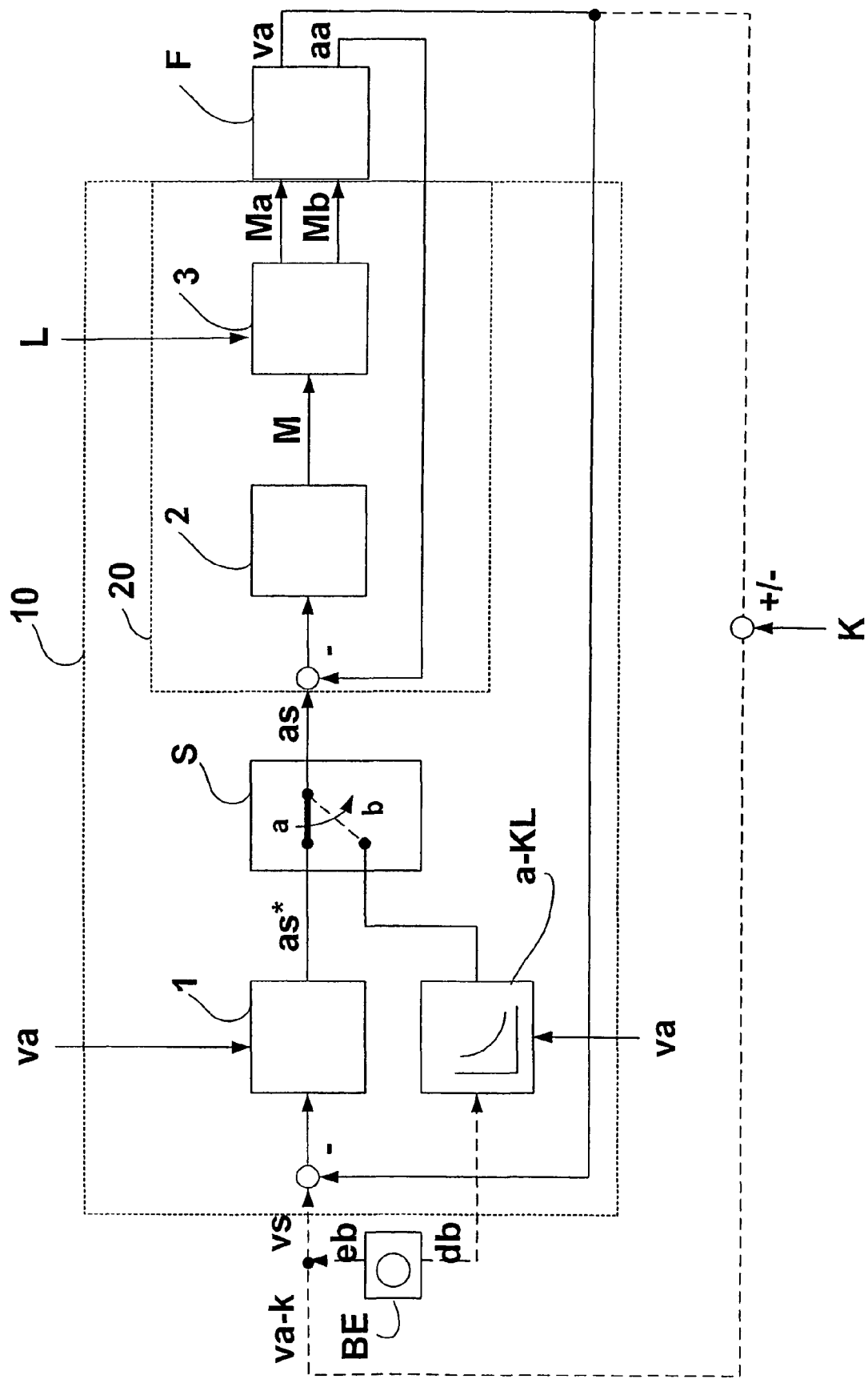

SPEED CONTROL SYSTEM AND METHOD FOR A MOTOR VEHICLE

CROSS-REFERENCE TO RELATED APPLICATIONS

This application is a continuation of PCT International Application No. PCT/EP2005/003453, filed on Apr. 1, 2005, which claims priority under 35 U.S.C. §119 to German Application No. 10 2004 016 513.0, filed Apr. 3, 2004, the entire disclosures of which are expressly incorporated by reference herein.

BACKGROUND AND SUMMARY OF THE INVENTION

The invention relates to a speed control system for a motor vehicle including a unit for calculating a drive torque or brake torque as a function of a pre-definable target speed, wherein the target speed is pre-defined by the single actuation of an operable control element.

Currently, there exist a variety of speed control systems in motor vehicles that are actuated by operating a control element. Automatic speed control systems may be designed, for example, as so-called adaptive cruise control (ACC) systems.

For example, German patent document DE 43 38 098 C2 discloses a control lever, which is mounted, like a conventional blinker lever, in the region of the steering wheel and which is intended for a speed controller in a motor vehicle. To select various functions, which include, among other things, setting a target speed, retrieving a stored target speed, and turning off the speed control system, the control lever can be moved manually in directions that are perpendicular to each other.

German patent document DE 199 61 720 C2 discloses a method for controlling the speed of a motor vehicle with a drive motor and a brake, wherein the speed control is activated by the driver in order to maintain the driving speed of the vehicle at a pre-defined target speed.

The object of the invention is to provide an improved speed control system.

The invention meets this need by providing a speed control system for motor vehicles having a unit for calculating a drive torque or brake torque as a function of a pre-definable target speed, wherein the target speed is pre-defined by the single actuation of an operable control element. A sustained actuation (db) of the control element (BE) pre-defines a target acceleration (as), instead of a target speed (vs). The drive torque (Ma) or brake torque (Mb) are calculated from the target acceleration. Advantageous further developments of the invention are described and claimed herein.

The inventive speed control system for a motor vehicle includes a unit for calculating a drive torque or brake torque as a function of a pre-definable target speed, the target speed being pre-defined by the single actuation of an operable control element, wherein a sustained actuation of the control element pre-defines a target acceleration, instead of a target speed, the drive torque or brake torque being calculated from the target acceleration.

The speed control system of the invention offers the advantage that the driver may choose between a target speed input or a target acceleration input. If the driver wants to raise or reduce the current speed to a new speed value, the driver operates the control element once, or multiple times, in order to pre-define the corresponding target speed. For example, a one-time single actuation in the positive direction pre-defines a target speed that is raised or reduced by 1 km/h with respect to the current speed. Multiple single actuations pre-define a target speed that, according to the number of single actuations, is raised or reduced by multiples of 1 km/h with respect to the current speed.

If, in contrast, the driver intends to accelerate or decelerate, he may pre-define, according to the invention, a target acceleration by way of a sustained actuation of the control element. The driver's input of a target acceleration offers the additional advantage that the vehicle experiences, in a repeatable manner, the same acceleration or deceleration independently of the current load resistance. For example, when driving downhill, the driver is not surprised by an acceleration that is higher than would be the case for a deceleration input or drive input without acceleration. When pre-defining the target acceleration, a defined target acceleration is fixed directly into the vehicle's memory. Whereas when pre-defining the target speed, the acceleration is the indirect product of the difference between the target speed and the actual speed, thus the current speed. When pre-defining the target acceleration, the target speed is not pre-defined, rather the driver operates the control element as long as he wants to accelerate or decelerate the vehicle. The driver may be given the possibility of experiencing a prospective "flowing" with the traffic, where the vehicle reaction may be reproduced and controlled directly by the driver, since the driver is actively and directly tied into the control of the vehicle.

The control element may be constructed, for example, as a control lever on the steering wheel. A single actuation results from, for example, depressing or pulling once the control element for a short period of time. In contrast, a sustained actuation results from, for example, depressing or pulling the control element for a pre-defined period of time. A single actuation of the control element pre-defines, as a function of the direction of actuation, a target speed that is raised or reduced with respect to the current speed.

Similarly, a sustained actuation pre-defines a positive or negative target acceleration, as a function of the direction of actuation. The control element may also be constructed, for example, as a toggle switch, instead of a control lever.

Since, upon releasing the control element from the sustained actuation, there is no longer any suitable target speed, as a function of which the drive torque or brake torque may be calculated, once the control element is released, the current speed or a speed, which deviates by a pre-defined value from the current speed, is pre-defined in an advantageous manner as the target speed. The deviation from the current speed should deviate in terms of amount only negligibly from the current speed; and the direction should be pre-defined in such a manner that if the vehicle was accelerated beforehand, this direction is greater than the current speed; and if the vehicle was decelerated beforehand, this direction is less than the current speed. The deviation offers the advantage that the change in the acceleration or the deceleration is effected in a comfortable manner for the driver with an asymptotic transition into continuous drive.

The target acceleration may be a permanently pre-defined value. The target acceleration may be pre-defined in an advantageous manner as a function of at least one parameter. For example, the target acceleration may be pre-defined as a function of the current vehicle speed or other operating parameters of the vehicle. The higher the current vehicle speed, the smaller the target acceleration should be in terms of amount. It is also contemplated to pre-define the target acceleration, among other things, as a function of the driving style of the driver. The target acceleration may be pre-defined from a characteristic or a family of characteristics.

In calculating the drive torque or the brake torque, the load resistances, such as for a mountain trip or a valley trip or the aerodynamics of the vehicle, are considered in an advantageous manner in order to set as accurately as possible the target speed.

The control element may be operated in an advantageous manner on several control levels. Therefore, a single actuation of the control element pre-defines a control level-specific target speed; and a sustained actuation pre-defines a control level-specific target acceleration.

Control elements with several control levels are already used in the area of automatic speed control. Therefore, if, for example, the control element is operated on a first level, the target speed is raised or reduced by 1 km/h. In contrast, if the control element is operated on a second control level, the target speed is raised or reduced, for example, by 5 km/h or 10 km/h. Consequently a further development of the invention makes it also possible to pre-define a number of different target accelerations on the various control levels by use of a sustained actuation of the control element.

Other objects, advantages and novel features of the present invention will become apparent from the following detailed description of the invention when considered in conjunction with the accompanying drawings.

BRIEF DESCRIPTION OF THE DRAWINGS

The drawing shows one embodiment of the inventive speed control system according to the invention.

DETAILED DESCRIPTION OF THE DRAWINGS

The single FIGURE depicts a speed control system 10 for a motor vehicle F including units 1, S, 2 and 3 for calculating a drive torque Ma or brake torque Mb as a function of a pre-definable target speed "vs", wherein the target speed "vs" is pre-defined by way of a single actuation eb of an operable control element BE. In the event of a single actuation eb of the control element BE, the switch S is located in the position a. If, for example, the driver operates the control element BE once at a current speed va of 80 km/h, a target speed vs of 81 km/h is pre-defined. An acceleration as, which is pre-defined as the target acceleration as, is calculated indirectly as a function of the current speed va of the vehicle F and the pre-defined target speed vs in a first unit 1 for the purpose of obtaining the desired target speed vs. From the target acceleration as, calculated in this case, the drive torque Ma or the brake torque Mb is calculated by way of a well-known acceleration control 20 having the units 2 and 3. From the difference of the target acceleration as and the current acceleration aa, a request torque M is calculated in the unit 2, a drive torque and/or brake torque being calculated from the request torque in the unit 3. The calculation of the drive torque Ma or the brake torque Mb takes into consideration, in an advantageous manner, the load resistances L of the vehicle F. The vehicle F is driven with the calculated drive torque Ma or the brake torque Mb, in order to obtain a current speed va, which is equal to the pre-defined target speed vs.

A sustained actuation db of the control element BE pre-defines, according to the invention, a target acceleration as, instead of the target speed vs, wherein the drive torque Ma or the brake torque Mb are calculated from this target acceleration. In the event of a sustained actuation db, the switch S is in the position b. The target acceleration as is pre-defined, in an advantageous manner, as a function of the current speed va. It is pre-defined by use of a characteristic curve a-KL. The acceleration control 20 is carried out in a manner identical to the acceleration control 20 when the target speed is pre-defined.

Once the control element BE is released from the sustained actuation db, a speed va-k, which deviates by a pre-defined value K from the current speed va, is pre-defined in an advantageous manner as the target speed vs. If the control element BE is operable on several control levels, a sustained actuation db pre-defines in an advantageous manner a control level-specific target acceleration as.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Speed control system for a motor vehicle, comprising:
   a unit for calculating a drive torque or brake torque as a function of a pre-definable target speed, the target speed being pre-defined by a single actuation of an operable control element;
   wherein a sustained actuation (db) of the control element (BE) pre-defines a target acceleration (as), instead of a target speed (vs), the unit calculating the drive torque (Ma) or brake torque (Mb) from the target acceleration,
   wherein the calculation of the drive torque (Ma) or the brake torque (Mb) takes into consideration load resistances (L) of the vehicle (F), and
   wherein the target acceleration is pre-defined as a function of a driving style of the driver.

2. The speed control system, as claimed in claim 1, wherein, upon releasing the control element (BE) from the sustained actuation (db), a current speed (va) or a speed (va-k), which deviates by a pre-defined value (K) from the current speed (va), is pre-defined as the target speed (vs).

3. The speed control system, as claimed in claim 1, wherein the target acceleration (as) is pre-defined as a function of at least one parameter (va).

4. The speed control system, as claimed in claim 1, wherein the control element (BE) is operable on several control levels, and further wherein a sustained actuation (db) pre-defines a control level-specific target acceleration (as).

* * * * *